(No Model.)
G. H. SELLERS.
CHUCK.
No. 507,598.  Patented Oct. 31, 1893.
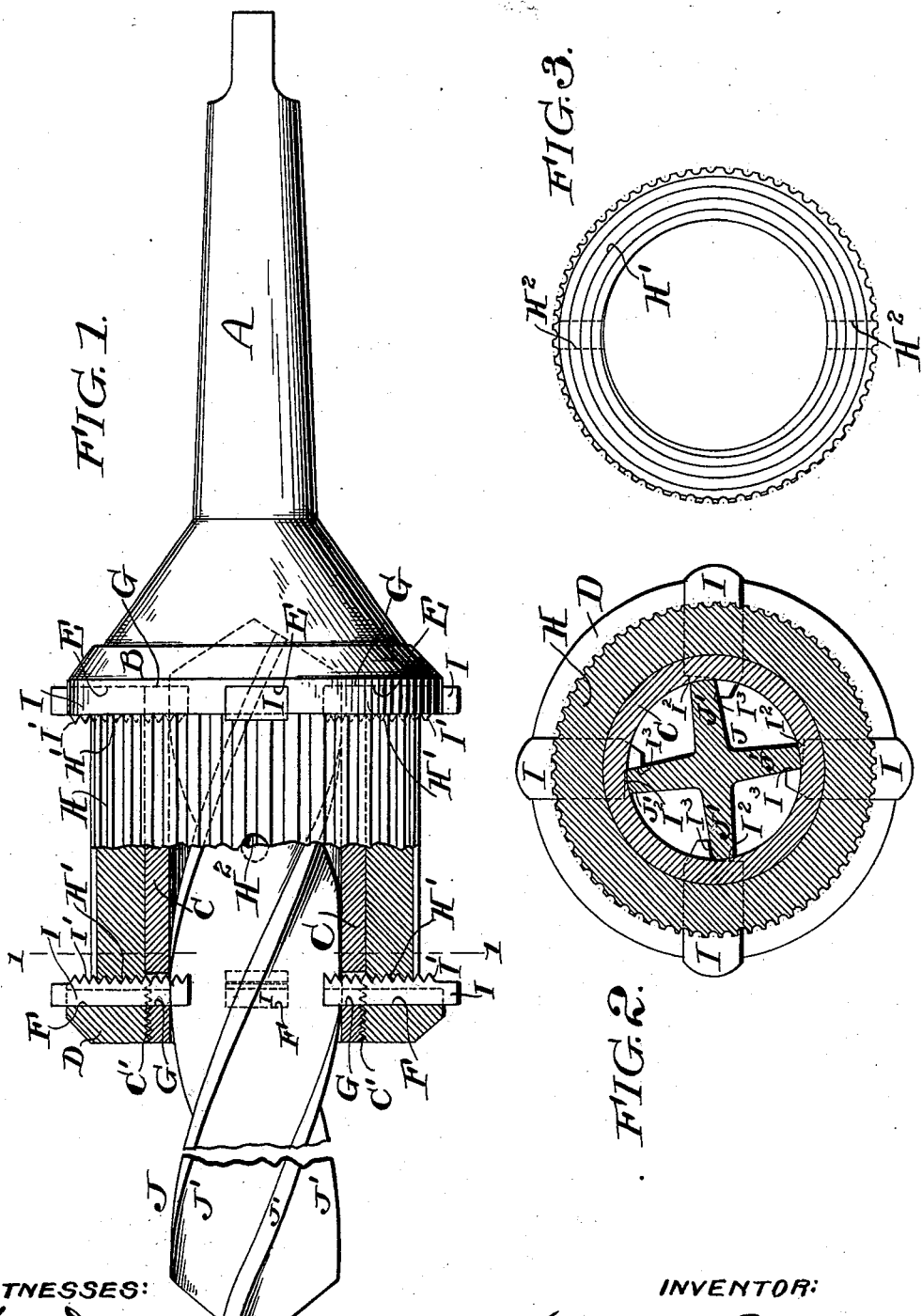
WITNESSES:
INVENTOR:
George H. Sellers
by his atty.
Francis T. Chambers

UNITED STATES PATENT OFFICE.

GEORGE H. SELLERS, OF WILMINGTON, DELAWARE.

CHUCK.

SPECIFICATION forming part of Letters Patent No. 507,598, dated October 31, 1893.

Application filed December 23, 1892. Serial No. 456,109. (No model.)

*To all whom it may concern:*

Be it known that I, GEORGE H. SELLERS, a citizen of the United States, residing at Wilmington, in the county of New Castle, State of Delaware, have invented a certain new and useful Improvement in Chucks, of which the following is a true and exact description, reference being had to the accompanying drawings, which form a part of this specification.

My invention relates to the construction of chucks, and is designed with especial though not exclusive reference to use with twist drills such as are described in my Patent No. 443,297, of December 23, 1890, my object being to provide a chuck which will securely hold and correctly align said drill or similar tools.

The nature of my invention will be best understood as described in connection with the drawings in which it is illustrated, and in which—

Figure 1, is a side elevation partly shown in section of what I believe to be the best form of my invention. Fig. 2, is a cross-section on the line 1—1 of Fig. 1; and Fig. 3, is an end view of the sleeve which forms a part of the chuck shown in Figs. 1 and 2.

A, indicates the shank of the chuck which is preferably cast or forged integral with the head; the head as shown broadens out from the shank to a shoulder B beyond which the barrel C of less diameter extends, the end C' of this barrel being preferably threaded as shown.

D, is a nut corresponding in form to the shoulder B and adapted to screw on the threaded end C' of the barrel. The shoulder B and the face of nut D are grooved as indicated at E and F to form guides and these grooves are, so to speak, continued through the barrel C of the chuck head as indicated at G, G, &c., these recesses G, however, extending somewhat beyond the face of the grooves as shown.

I, I, &c., are clamps adapted to rest in the grooves E and F and to pass through the recesses G; they must form two sets of clamps in two parallel planes at some distance apart and to secure the results I aim at it is necessary to provide a jaw actuating device which will simultaneously act upon the jaws causing them to advance or recede to or from the center line of the chuck; this is most conveniently accomplished by forming on the opposite sides of the oppositely arranged sets of jaws threads I' and placing upon the barrel C a sleeve H having its ends H', H' threaded so as to engage the threads I' of the clamps. By turning the sleeve the clamps are simultaneously, and to the same extent, forced in toward or drawn out from the center of the chuck. The sleeve can be turned by hand but it is advisable to so construct it that a wrench can be applied to turn it and I have shown holes $H^2$, $H^2$, formed in it to engage the ends of a spanner.

The clamping faces of the clamps I are indicated at $I^2$, and I prefer for use with the twist drills before mentioned to form some or all of the clamps with lugs or extensions $I^3$ extending in from the faces $I^2$ and formed so as to lie against the face of one of the flanges J' of the drill J.

The chuck is assembled by placing the sleeve H on the barrel C and then screwing the nut D on the threaded end $C^2$, taking care that the grooves F register with the holes or recesses G. The clamps I are then inserted in the grooves and drawn in by turning the sleeve.

In use the drill J or other tool is inserted in the chuck and the sleeve turned until the faces $I^2$ of the clamps I come in contact with its arms J' which act together to grip and center the tool while the lugs $I^3$ engage the sides of the arms or flanges J' insuring that the tool shall turn with the chuck.

Having thus described my invention, what I claim as new, and desire to secure by Letters Patent, is—

1. A chuck having two sets of clamps I I set in parallel planes in combination with means engaging with both sets of clamps, for simultaneously actuating the clamps I of both sets equally to or from a common center line.

2. The combination of a chuck head, a series of clamps I some of which are provided with extensions $I^3$ extending inward beyond the clamping face $I^2$ said clamps being arranged in the head in two parallel planes and means for driving the clamps simultaneously to or from the center of the head.

3. The combination with a chuck head having recesses G G formed through it, of two sets of clamps guided in said recesses having threads I', and arranged in two parallel planes with their threaded sides opposite to each other and a sleeve H having its end H' threaded to engage both sets of clamps whereby the two sets of clamps are given simultaneous radial movements to or from the center of the head.

4. The combination with a chuck head having a barrel C with threaded end C' and a series of recesses G formed through it in two parallel planes of a series of clamps I having threaded sides I' guided in recesses G, a sleeve H having threaded ends H' adapted to engage with the threaded sides of the clamps said sleeve being supported on the barrel C and a nut D adapted to screw on the end C' and slotted at F, F, as and for the purpose specified.

GEO. H. SELLERS.

Witnesses:
FRANCIS T. CHAMBERS,
F. G. SELLERS.